F. W. MEYER.
SYSTEM OF CONTROL.
APPLICATION FILED MAR. 24, 1915.

1,308,094.

Patented July 1, 1919.
2 SHEETS—SHEET 1.

WITNESSES:
Fred. A. Lind
D. C. Davis

INVENTOR
Friedrich W. Meyer
BY
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,308,094.  Specification of Letters Patent.  Patented July 1, 1919.

Application filed March 24, 1915. Serial No. 16,681.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in System of Control, of which the following is a specification.

My invention relates to systems of distribution especially applicable to electric railways, and it has for its object to provide circuits and apparatus whereby the speed of a railway vehicle may be easily and economically controlled and whereby regeneration, when decelerating, may be accomplished in a simple and effective manner.

In the propulsion of railway vehicles, the direct-current motor has been developed to a high state of perfection and it has certain advantages over other types of motors which are well known in the art. It has a much more flexible range of speed variation than the ordinary induction motor and it is smaller and more efficient than a series commutating motor of the same rating because the latter must be provided with resistance leads or equivalent means for the control of commutation. It has, therefore, been proposed; where a high-voltage single-phase trolley is employed for economy of transmission and where it is desired to employ direct-current motors; to reduce the voltage of the supply by a transformer and to rectify the output of said transformer by an ordinary vapor-arc rectifier. This system, while exhibiting many desirable features in normal operation, is unable to regenerate current when coasting because the ordinary vapor-arc rectifier is not reversible. I, therefore, provide a vehicle, wherein it is desired to employ direct-current motors, with both rectifying and de-rectifying means, either separate or contained in the same apparatus; whereby I am enabled to employ the direct-current motor either normally or regenerating, as desired. My invention resides in circuits and apparatus whereby the above operations may be carried out, as will hereinafter more fully appear.

Figure 1:
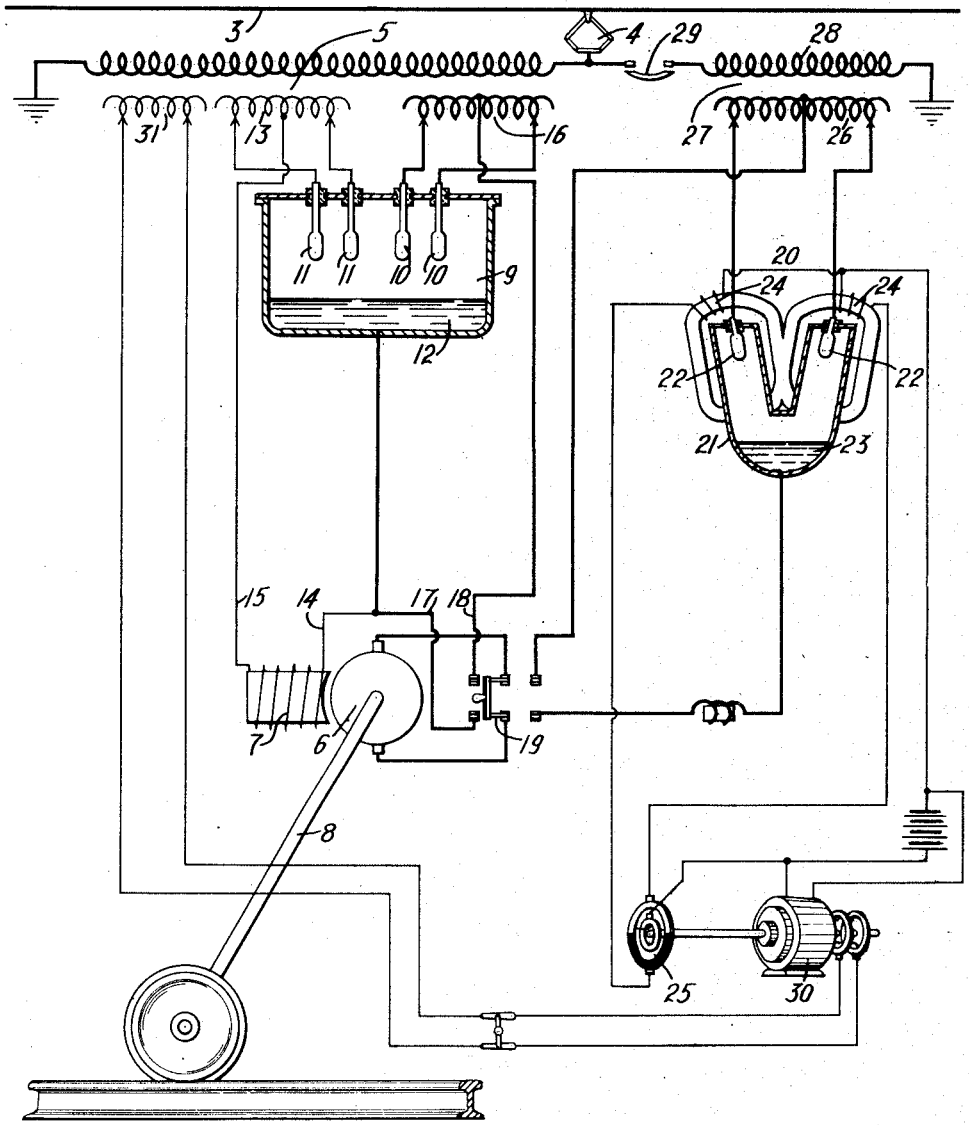
Figure 2:
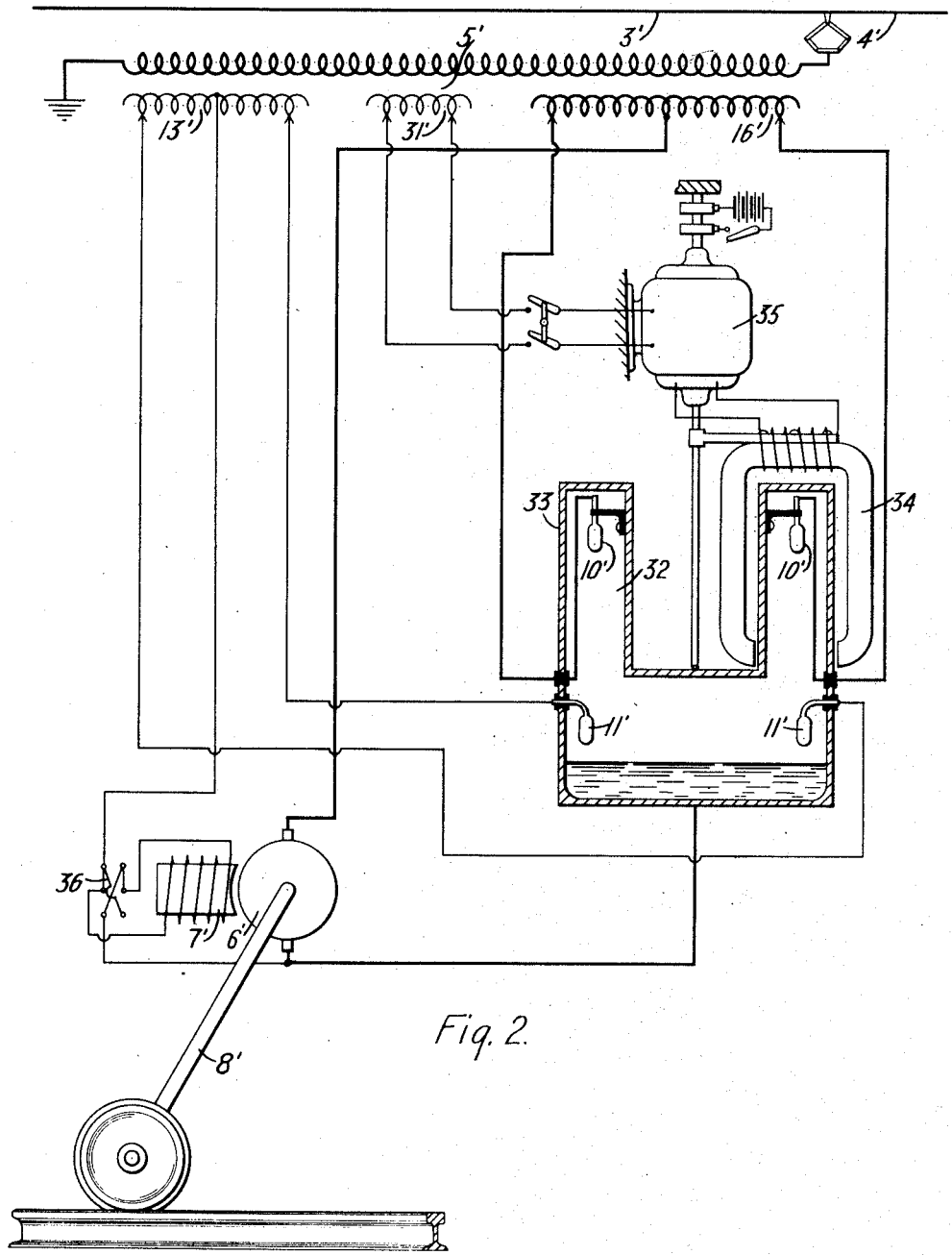

In the accompanying drawings, Figure 1 is a diagrammatic view of an arrangement of circuits and apparatus for an embodiment of my invention wherein rectification and de-rectification are performed in separate devices; and Fig. 2 is a diagrammatic view of a modification of the system shown in Fig. 1 wherein rectification and de-rectification are carried out in a single piece of apparatus.

In the form of my invention shown in Fig. 1, energy in the form of single-phase current is supplied to a railway vehicle from a trolley wire 3 through any suitable contact device 4 and its voltage is regulated to any desired amount by a transformer 5 provided with a plurality of adjustable secondary windings 13, 16 and 31. A direct-current motor 6, provided with an independently excited field winding 7, is connected to the vehicle axle 8 for propulsion purposes and, in normal operation, is supplied with direct current from a rectifier 9, preferably of the vapor-arc type. The rectifier 9 is provided with two pairs of anodes 10—10 and 11—11 and with a single reconstructing cathode 12 which may be maintained in active condition in any suitable and well known manner. The anodes 11—11 are connected, respectively, to the terminals of the secondary winding 13 on the transformer 5 and serve to supply energy solely to the field winding 7 through suitable wires 14 and 15. In like manner, the anodes 10—10 rectify current from the secondary winding 16 on the transformer 5 and supply energy solely to the armature of the motor 6 through suitable wires 17 and 18 and a double-throw switch 19, when the latter is closed in the left-hand position. As the secondary windings 13 and 16 are independently adjustable, it is possible to vary either the field or the armature current of the motor 6 throughout a wide range and, therefore, an extremely flexible control of both the speed and the torque may be obtained. There will be no interference between the two rectifying arcs in the same container, as is pointed out in my copending application, Serial No. 846,366, filed June 20, 1914, and assigned to the Westinghouse Electric & Manufacturing Company, although if desired, separate rectifiers may be employed for the rectification of the field and the armature current.

In order to provide for regeneration when de-celerating or coasting, I provide a de-rectifier 20 of any desired type such, for example, as described and claimed in my copending application, Serial No. 846,365, filed June 20, 1914, and assigned to the Westinghouse Electric & Manufacturing Company; or in U. S. Patent No. 877,026 to Ezechiel Weintraub. As this type of apparatus is as yet but little known, a brief description thereof may be advisable. An evacuated container 21 is provided with a plurality of anodes 22 in the upper portion thereof and a cathode 23 in the lower portion thereof. Suitable magnets 24 embrace the upper portion of the container 21 so as to produce a magnetic field across the arc path below the anodes 22. By means of a suitable rotating switch 25, the magnets 24—24 are successively temporarily deënergized and, therefore, a unidirectional arc, established within the container 21, will be continuously shifted from one anode to another and will, therefore, permit pulsating currents in the primary winding 26 of a transformer 27 conected thereto. In order to regenerate, the switch 19 is thrown to the right-hand position, and the secondary winding 28 of the transformer 27 is connected to the line by a suitable switch 29. The direct-current excitation of the field winding 7 is maintained by the anodes 11—11 in the rectifier 9, and direct current that is generated in the armature of the motor 6 establishes a unidirectional arc in the de-rectifier 20. The switch 25 is driven in synchronism with the frequency of supply by a synchronous motor 30 driven from a third secondary winding 31 on the transformer 5. The arc within the de-rectifier 20 will therefore be vibrated or rotated at the frequency of the line supply, and alternating current will be generated in the secondary winding 28 of a suitable character for supply to the line 3, with consequent effective regeneration. While, for clearness, I have shown the return of the regenerating current through the transformer 27, it may be, and, in practice, would be, returned through the transformer 5, thus saving weight and expense.

Referring to the form of my invention shown in Fig. 2, current is supplied to the motor 6' from a line 3' through a contact device 4' and a transformer 5'. During normal operation, the field winding 7' of the motor 6' is excited from a secondary winding 13' and the anodes 11'—11' of a combined rectifier and de-rectifier 32, to be hereinafter described more in detail. In like manner, the armature of the motor 6' is supplied with energy from a secondary winding 16' through anodes 10'—10' in the apparatus 32. The anodes 10'—10' are mounted in an upwardly extending flange 33 on the container of the device 32, and a magnet 34, embracing said flange, is adapted to be rotated by a synchronous motor 35 so that it sweeps, in succession by each of the anodes 10'—10'. When it is desired to regenerate, the motor 35 is driven at synchronous speed from a secondary winding 31', and the unidirectional arc within the device 32, set up by current flow from the armature of the machine 6', is caused to flow alternately from each anode 10'—10' by the magnetic control of the magnet 34. Pulsating current is therefore set up in the two halves of the winding 16' for generating alternating current in the primary winding of the transformer 5' of a suitable character for return to the line 3'. The voltage of the regenerated electromotive force may be adjusted either at the secondary winding 16' or by changing the excitation of the field winding 7' at the secondary winding 13'. It will be noted that, during the regenerating operation, alternating current is being rectified at the anodes 11'—11' and direct current is, at the same time, being de-rectified at the anodes 10'—10'. I find that no difficulty is encountered in carrying on these two operations within the same evacuated space although the machine 6' may be self-exciting during regeneration. In order that the generated electromotive force of the machine 6' shall be in the right direction for flow from the anodes 10'—10', it is necessary, during regeneration, to reverse the polarity of the machine 6', as, for example, by a double-pole, double-throw switch 36 inserted in the field circuit.

While I have shown my invention in two distinct embodiments, it will be apparent to those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. A vacuum electric device embodying means for simultaneously rectifying alternating-current energy and de-rectifying direct-current energy within a single container.

2. In a distributing system, the combination with a source of alternating current, of a doubly-functioning vacuum electric device provided with means for simultaneously rectifying energy from said source and for de-rectifying energy and supplying said de-rectified energy to said source all within a single container.

3. A vacuum electric device embodying means for simultaneously rectifying alternating-current energy and de-rectifying direct-current energy within a single container, said de-rectifying means being reversible in function.

4. In a distributing system, the combination with a source of alternating current, of a doubly functioning vacuum electric device provided with means for simultaneously rectifying energy from said source within a single container and for de-rectifying energy and supplying said de-rectified energy to said source, said de-rectifying means being reversible in function.

5. In a recuperative motor control system, the combination with an alternating-current supply, of a direct-current motor provided with independent field and armature windings, a single exhausted container embodying means for independently rectifying current for both field and armature windings during normal operation, said container also embodying means for de-rectifying current generated by the armature when recuperating while still rectifying current for field excitation, and means for reversing the currents in the field and armature windings with respect to each other when regenerating.

In testimony whereof, I have hereunto subscribed my name this 12th day of March, 1915.

FRIEDRICH W. MEYER.

Witnesses:
D. C. DAVIS,
B. B. HINES.

---

It is hereby certified that in Letters Patent No. 1,308,094, granted July 1, 1919, upon the application of Friedrich W. Meyer, of Pittsburgh, Pennsylvania, for an improvement in "Systems of Control," errors appear in the printed specification requiring correction as follows: Page 2, lines 128--129, claim 4, strike out the words "within a single container;" page 3, line 1, claim 4, after the word "source" insert the words *within a single container;* and that the said Letters Patent should be read with these corrections therein that the same may conform to the record of the case in the Patent Office.

Signed and sealed this 26th day of August, A. D., 1919.

[SEAL.]

M. H. COULSTON,

*Acting Commissioner of Patents.*

Cl. 175—363.